(No Model.) 6 Sheets—Sheet 1.

P. PROVOST.
GRAIN SCOURER.

No. 398,538. Patented Feb. 26, 1889.

WITNESSES: INVENTOR
P. Provost
BY Munn & Co.
ATTORNEYS.

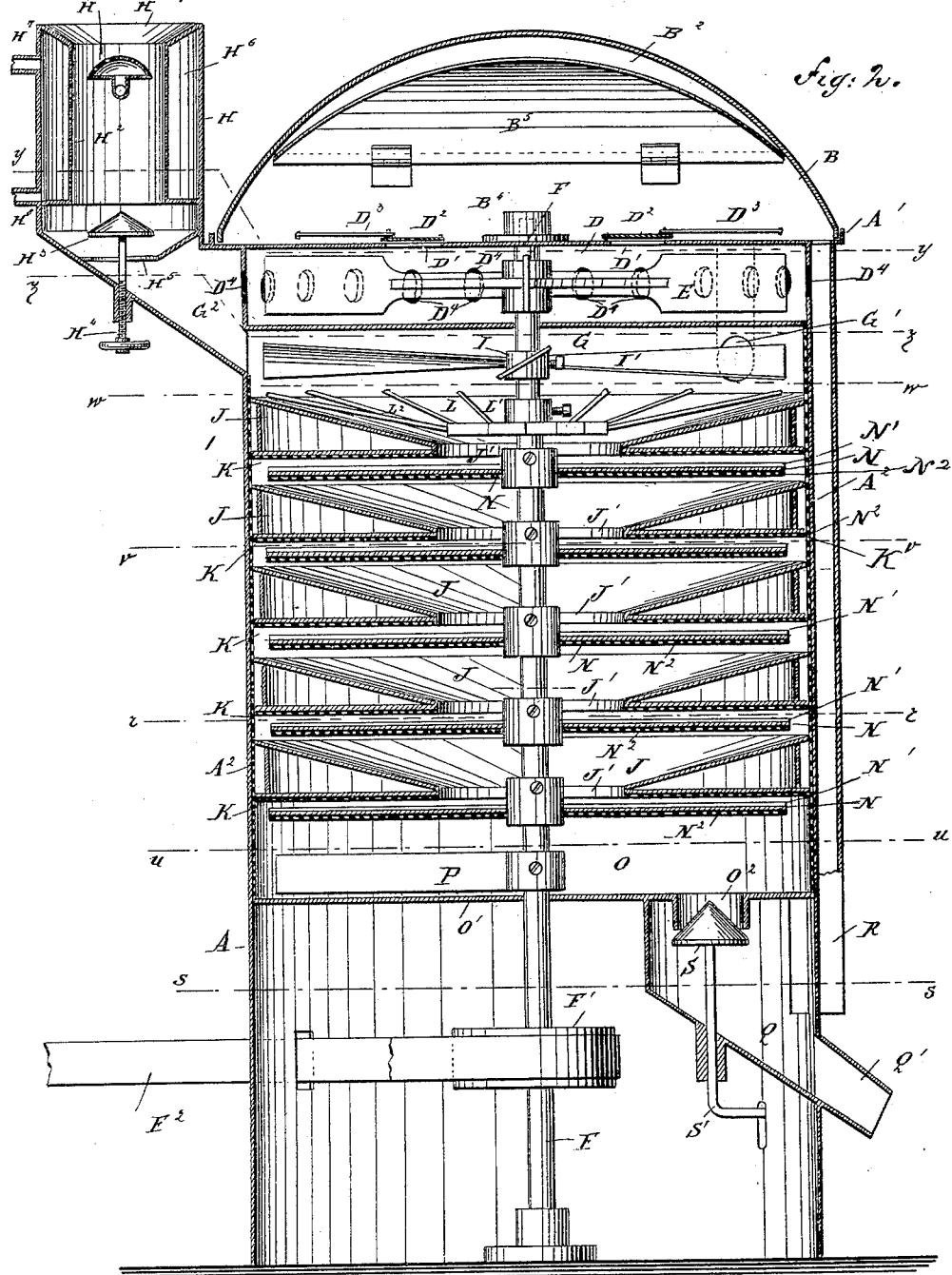

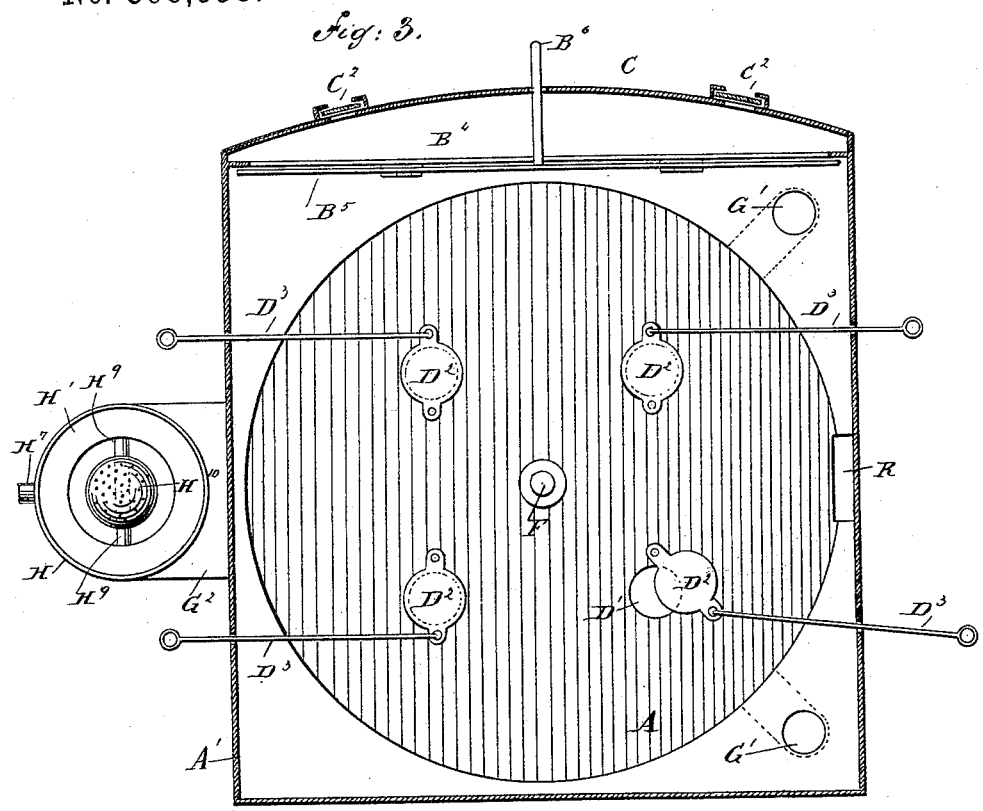
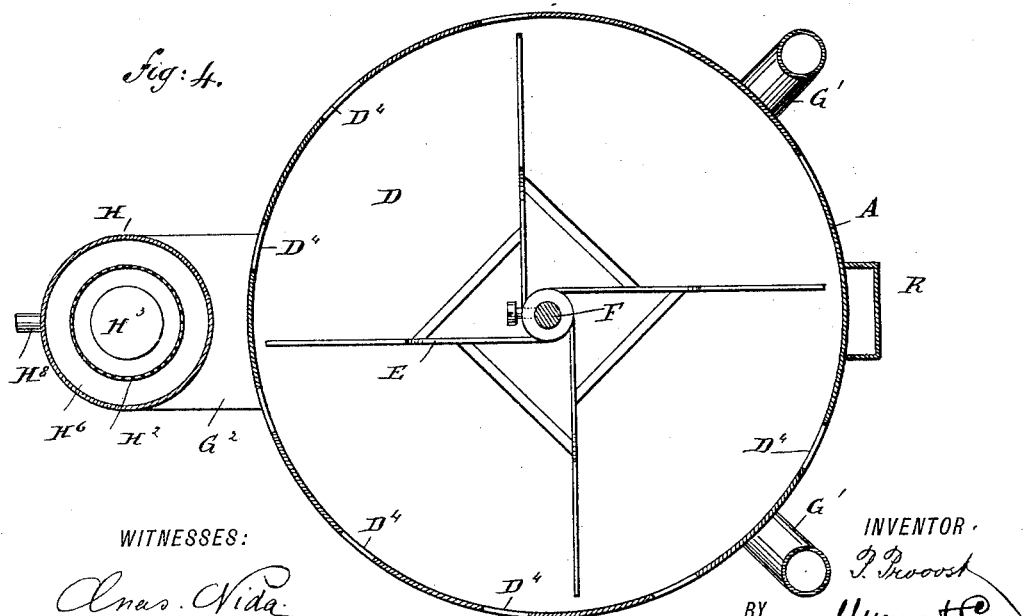

(No Model.)  6 Sheets—Sheet 4.
P. PROVOST.
GRAIN SCOURER.
No. 398,538.   Patented Feb. 26, 1889.
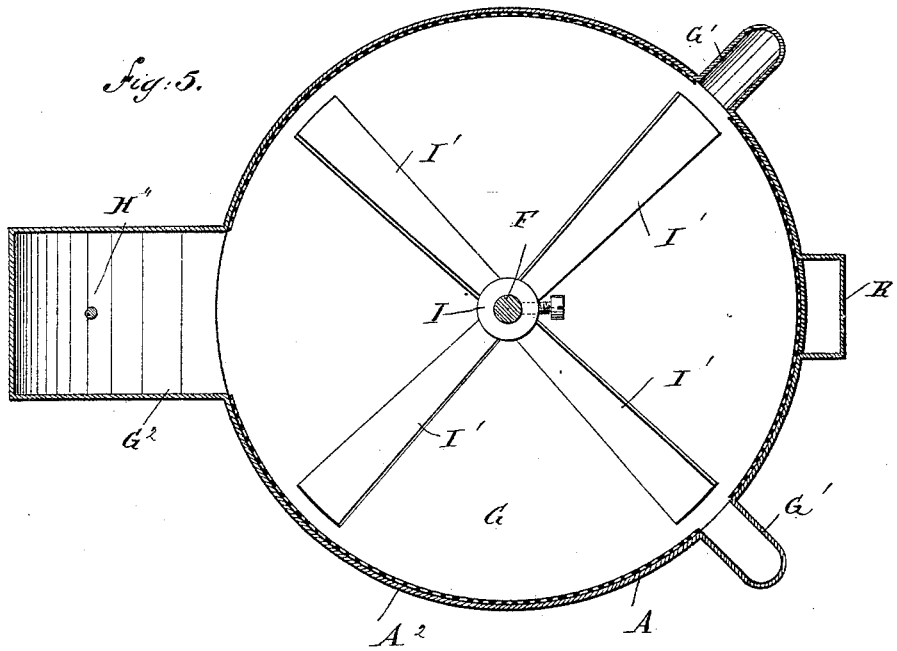
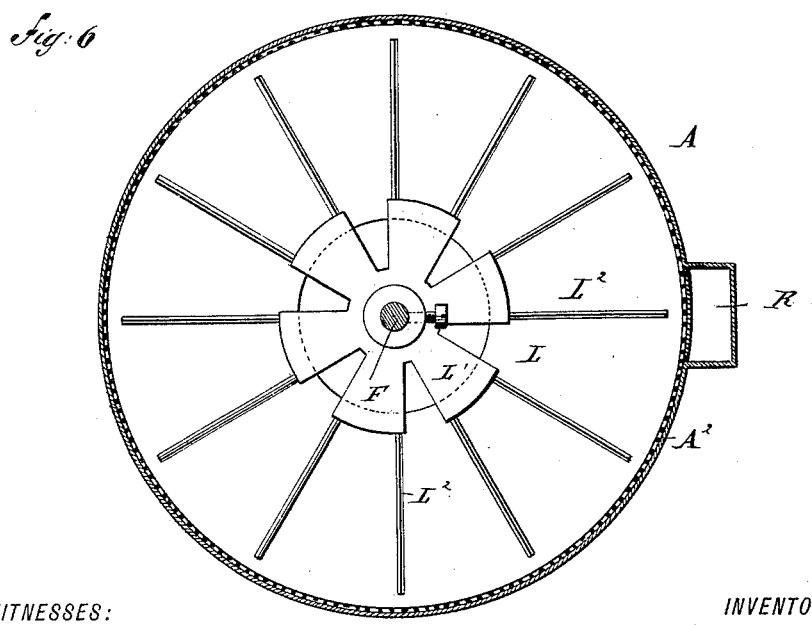
WITNESSES:
INVENTOR:
P. Provost
BY Munn & Co.
ATTORNEYS.

(No Model.) 6 Sheets—Sheet 5.

P. PROVOST.
GRAIN SCOURER.

No. 398,538. Patented Feb. 26, 1889.

WITNESSES:
Chas. Nida
C. Sedgwick

INVENTOR,
P. Provost
BY Munn & Co.
ATTORNEYS.

(No Model.) 6 Sheets—Sheet 6.
P. PROVOST.
GRAIN SCOURER.

No. 398,538. Patented Feb. 26, 1889.

WITNESSES:
Chas. Niaa
C. Sedgwick

INVENTOR,
P. Provost
BY Munn & Co.
ATTORNEYS.

UNITED STATES PATENT OFFICE.

PETER PROVOST, OF MENOMINEE, MICHIGAN.

GRAIN-SCOURER.

SPECIFICATION forming part of Letters Patent No. 398,538, dated February 26, 1889.

Application filed April 13, 1888. Serial No. 270,517. (No model.)

*To all whom it may concern:*

Be it known that I, PETER PROVOST, of Menominee, in the county of Menominee and State of Michigan, have invented a new and Improved Grain-Cleaner, of which the following is a full, clear, and exact description.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1:
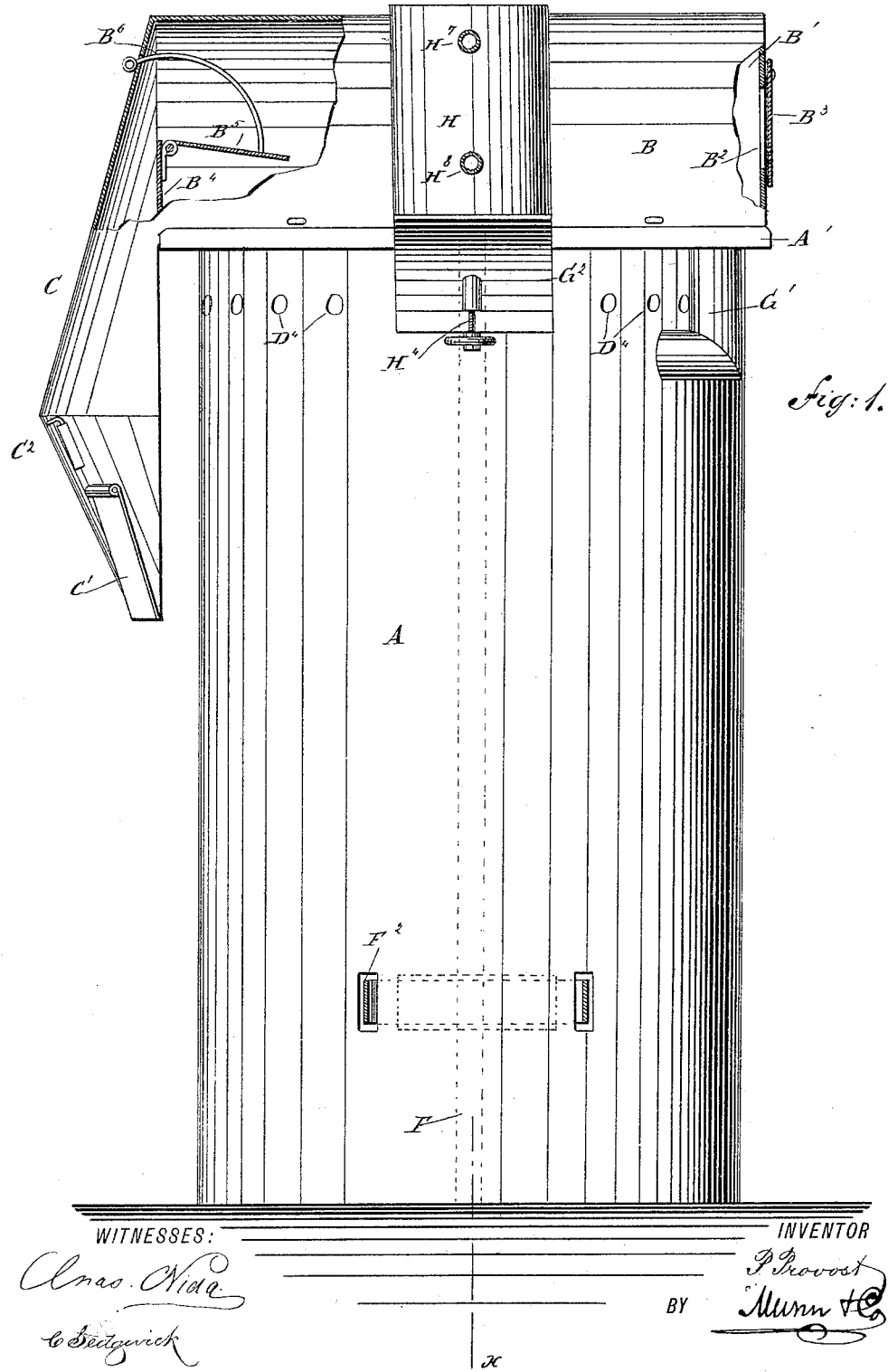
Figure 7:
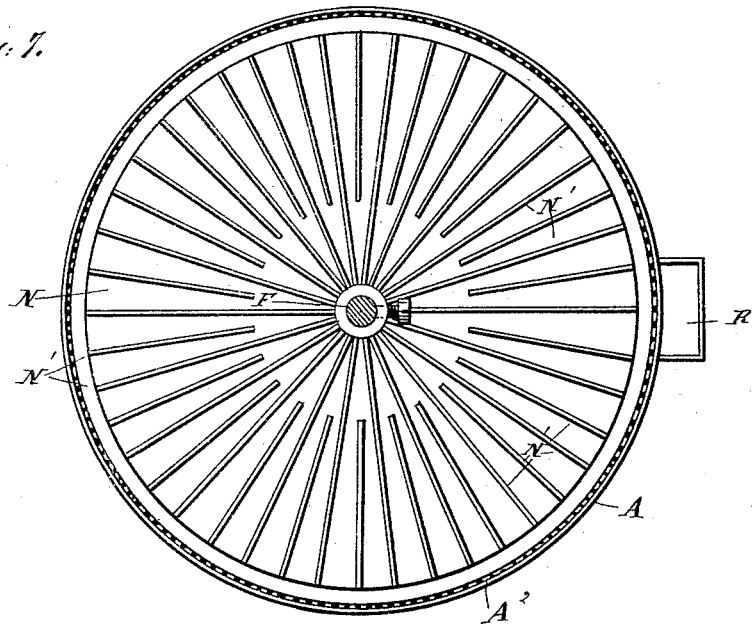
Figure 8:
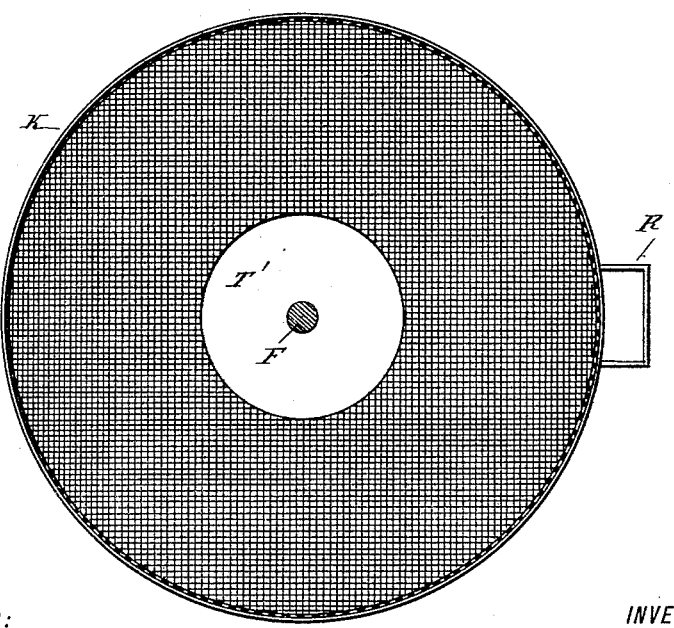
Figure 9:
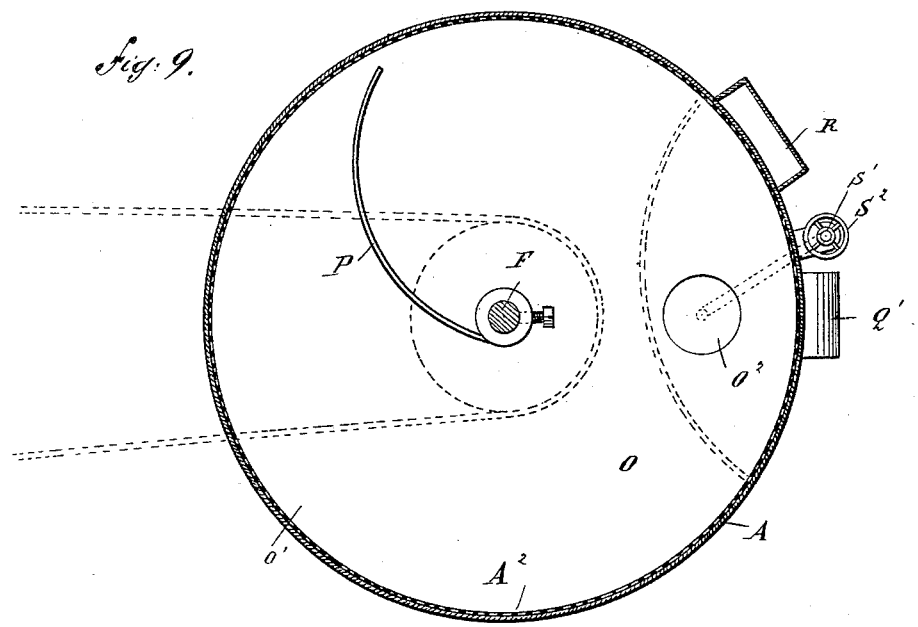
Figure 10:
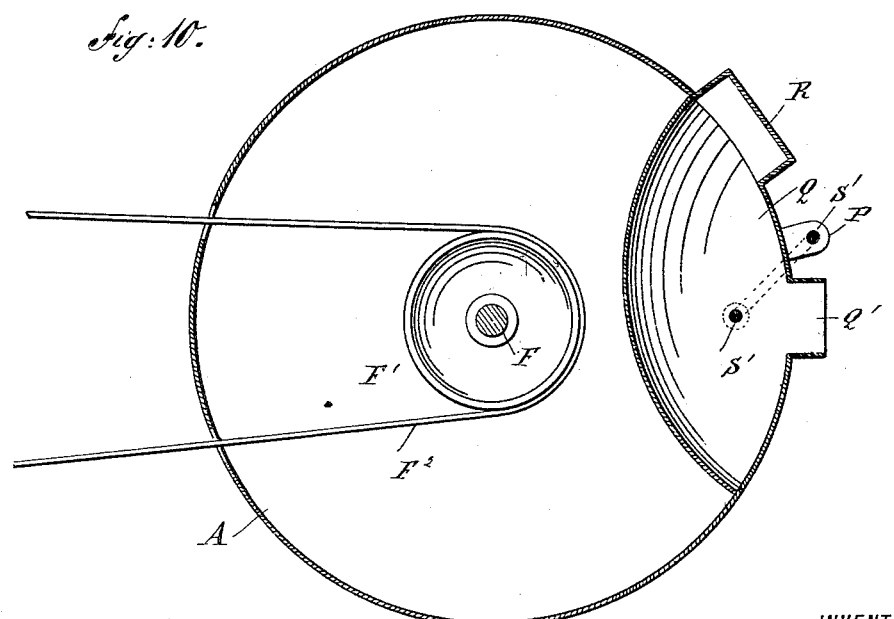

Figure 1 is an end elevation of the improvement with parts in section. Fig. 2 is a sectional side elevation of the same on the line $x$ $x$ of Fig. 1. Fig. 3 is a plan view of the improvement with the cap in section, the top being removed. Fig. 4 is a sectional plan view of the improvement on the line $y$ $y$ of Fig. 2. Fig. 5 is a like view of the same on the line $z$ $z$ of Fig. 2. Fig. 6 is a similar view of the same on the line $w$ $w$ of Fig. 2. Fig. 7 is a like view of the same on the line $v$ $v$ of Fig. 2. Fig. 8 is an inverted sectional plan view of the same on the line $r$ $r$ of Fig. 2. Fig. 9 is a sectional plan view of the improvement on the line $u$ $u$ of Fig. 2, and Fig. 10 is a similar view of the same on the line $s$ $s$ of Fig. 2.

The improved grain-cleaner is provided with a stationary cylinder, A, having a rectangular top, A′, and provided on its inside throughout nearly the whole length with a lining, $A^2$, made of wire screen. On the rectangular top A′, and forming therewith a dust-chamber, $A^3$, is set a cap, B, semicircular in shape, and provided at its front end, B′, with an opening, $B^2$, adapted to be closed by a swinging lid, $B^3$, pivoted on the said end B′. The other end of the cap B is made in two pieces, $B^4$ and $B^5$, of which the part $B^4$ is stationary and the part $B^5$ is hinged to the said part $B^4$, and provided with an arm, $B^6$, for opening or closing the said hinged part B′. On this end of the chamber $A^3$ is secured a downwardly-extending closed chamber, C, adapted to be opened into the cap B by the said hinged part $B^5$, as is plainly shown in Fig. 1. On the lower end of the chamber C are formed the hinged doors C′, and the sliding doors $C^2$ are also secured on the lower part of the said chamber C to permit a view of the inside of the said chamber C, in order to find out whether the lower part of the chamber C is filled with dust and other substances.

In the upper end of the cylinder A is formed a chamber, D, provided in its top plate with a number of openings, D′, adapted to be opened and closed by hinged covers $D^2$, operated by rods $D^3$, extending through the sides of the cap B. In the said chamber D is a fan, E, secured to the vertical shaft F, which is mounted centrally in the cylinder A on suitable bearings, and extending throughout the entire length of the latter. On the lower end of the shaft F is secured a pulley, F′, over which passes a belt, $F^2$, connected with suitable machinery for imparting a rotary motion to the said shaft F. The belt $F^2$ extends through suitable openings in the cylinder A.

Below the chamber D is formed a chamber, G, connected by one, two, or more pipes or flues, G′, with the interior of the chamber $A^3$, as illustrated in Figs. 1, 2, and 3. These pipes serve to conduct the moisture from chamber G to the chamber $A^3$, through which it passes to the chamber D, and out through the discharge apertures or openings $D^4$, formed in casing A, as shown in Fig. 1. Into this chamber G opens a chute, $G^2$, secured to the outside of the casing A and supporting at its top a steam-cylinder, H. This cylinder is provided on its upper end with an inwardly and downwardly inclined flange, H′, the inner end of which rests on the top end of a perforated cylinder, $H^2$, held concentrically in the said steam-cylinder H, and forming a steam-chamber, $H^6$, therewith. The lower end of the perforated cylinder $H^2$ opens on a conical valve, $H^3$, adapted to be seated on the seat $H^5$, connected with the chute $G^2$. The valve $H^3$ is secured on a valve-stem, $H^4$, screwing in the chute $G^2$, so as to regulate the amount of opening between the said valve $H^3$ and the seat $H^5$.

Into the steam-chamber $H^6$ leads a steam-pipe, $H^7$, and from the lower end of the said steam-chamber $H^6$ leads a pipe, $H^8$, for carrying off the water of condensation. With the said steam-chamber $H^6$ also connect the pipes $H^9$, extending inward into the perforated cylinder $H^2$, and opening into the interior of a semicircular nozzle, $H^{10}$, perforated at its upper end, and serving as a distributer for the grain entering on the flange H' of the cylinder H. The pipes H⁹ support the said nozzle H¹⁰, and the latter, on account of its spherical shape, distributes the entering grain equally in the cylinder H², at the same time subjecting the grain passing over the said nozzle H¹⁰ to the action of the steam passing through the perforations in the top of said nozzle.

In the chamber G operates a wheel, I, provided with inclined blades I' and secured to the revolving shaft F. This wheel I serves to press the grain entering through the chute G² downward on the concave disk J, provided in its middle with an opening, J', and secured to the interior of the cylinder A. On the top surface of the disk J operates an agitator, L, provided with a hub, L', secured to the shaft F, and from the said hub L' extend the radial upwardly-inclined arms L², which agitate the grain entering through the chute G², and passing on the disk J before the said grain falls through the opening J' in the said disk J. The bottom of the disk J is made of a wire screen, K, having a central opening corresponding to the opening J' in the disk J.

Directly below the screen K of the disk J a flat disk, N, is secured by a suitable hub to the shaft F, and on the top of the said flat disk N are secured the radial arms N', (see Fig. 7,) and on the bottom of the said flat disk is secured a wire screen, N². Said disk N extends to within a short distance of the interior of the cylinder A, leaving sufficient room for the kernels of the grain to pass downward between the periphery of the said disk N and the lining A² of the cylinder A. Directly below disk N a concave disk, J, is secured to the shaft, similar in construction and shape to the one above described, and also provided with a central opening, J', and a bottom screen, K. Next to this disk J, and secured to the shaft F, is another flat disk N, provided on the top and bottom with radial arms and wire screens, respectively, as above described in reference to the first disk N. Any number of such concave disks J and flat disks N may be placed one above the other, as shown in Fig. 2.

The lowest disk N discharges into a chamber, O, having a bottom plate, O', in which is an opening, O², adapted to be opened and closed by a valve, S, secured to a valve-stem, S', extending downward and outward, and being provided with a hand-wheel, S², Fig. 9, for raising and lowering said valve S, in order to open and close the opening O². In the chamber O a curved arm, P, is secured by a suitable hub to the revolving shaft F, said arm P being close to the bottom O', and serving to push the grain into the opening O². The latter opens into a chamber, Q, provided with a spout, Q', extending to the outside of the casing A. From the chamber Q an opening leads to a channel, R, which extends upward on the outside of the casing A and opens into the interior of the cap B.

The operation is as follows: The shaft F is set in motion, so as to impart a rotary motion to the arm P, the several disks N, the agitator L, the wheel I, and the fan-wheel E. The grain to be cleaned is discharged on the inclined flange H' of the cylinder H, so that the grain passes over the semicircular nozzle H¹⁰, and is there subjected to the action of steam passing through the perforations of the nozzle H¹⁰. The downwardly-falling grain then comes in contact with the periphery of the cylinder H², and is again subjected to the action of the steam emitted through the perforations of the said cylinder H², so that through the double action of the steam foreign substances adhering to the kernels are loosened, as the said steam subjects the grain to a bath. The grain, passing downward through the cylinder H², passes on the conical valve H³, and from the latter falls through the valve-seat H⁵ into the chute G², which delivers the grain into the chamber G, from which it passes on the inclined surface of the first concave disk J. The rotating wheel I, with its inclined blades I', serves to press the kernels downward on the top surface of the said disk J, and the inclined radial arms L² of the agitator L cause the kernels to be turned over and over before they finally reach the opening J' in the disk J. The grain passing through the opening J' falls on the disk N between the arms N', secured on the top of the said disk, and by the centrifugal force of the said arms N' the grain is moved outward and is rubbed against the wire screen K, forming the bottom of the concave disk J. The radial arms N' hold the grain on the revolving disk N, but permit an outward motion of the said grain, at the same time rubbing the grain against the wire screen K. The kernels of grain finally reach the periphery of the disk N and drop over the latter and on the next concave disk J. The kernels thus passing on this disk J move downward on the inclined top surface of the same and pass through the opening J' into the next following disk N, to be again treated in the same manner as above described in reference to the first disk N. The grain will rise sufficiently high in its passage through and past the disks J N to be acted upon by the roughened surfaces formed by the screens N² or portions thereof. The mass of grain, being acted upon by both sides of the disks N, as well as by the wire-screen bottoms K of the concave disks J and the screen A², will be so distributed that little or none will fail to be cleaned. The grain passing off of the last disk N falls on the bottom plate, O', of the chamber O, and is pushed by the curved arm P toward and into the opening O², from which the grain, when the valve S is open, passes over the said valve S and into the chamber Q, and down the latter through the chute Q' to the outside of the cylinder A. The amount of grain permitted to pass through the opening O² is regulated by adjusting the valve S. The rotary movement of the shaft F causes the fan-wheel E to create a suction in the cap B when the covers D² of the openings D' are partly or wholly open, so that the impurities and loosened particles of the grain passing into the chamber Q are drawn from the latter into the channel R and up the same into the cap B. The hinged part B⁵ of one end of the cap B is opened, so that the heavier particles pass over the said hinged part B⁵ into the chamber C and accumulate on the bottom of the same. When a sufficient amount has accumulated in this chamber C, the hinged part B⁵ is closed and the doors C' are opened to permit the accumulated impurities to pass out of the lower end of the chamber C. The doors C' are then again closed and the hinged part B⁵ is again opened. The lighter particles drawn up by the suction of the fan E pass into the chamber D and are discharged from the same through the openings D⁴ in the said cylinder A. It will be seen that the grain is first subjected to a steam bath in the cylinder H, and is then delivered to the chamber G and permitted to pass to the disk N, which, in connection with the wire screen K, removes the loosened particles of the kernels, so that the latter, with the loose parts, finally pass into the chamber Q, in which the impurities are separated from the cleaned kernels.

The interior of the cylinder A is intended to be constantly full of grain, so as to facilitate the cleaning process by causing the kernels to rub against each other and against the several parts located in the interior of the cylinder, as above described.

Having thus fully described my invention, I claim as new and desire to secure by Letters Patent—

1. The combination, with the cylinder having a dust-chamber and suction-fan therefor at its upper end, a grain-inlet leading into the upper end of the cylinder, and a discharge-chute at the lower end of the cylinder, of pipes leading from the upper end of the cylinder into the dust-chamber, a channel leading from said chute upwardly into the dust-chamber, and the shaft provided with cleaning-disks in said cylinder, substantially as set forth.

2. In a grain-cleaner, the combination, with a cylinder provided with a wire-screen lining and a suitable inlet, of an imperforate concave disk having a central opening and secured to the said cylinder, a shaft journaled centrally in the said cylinder, an agitator having inclined radial arms and secured to the said rotating shaft, said arms extending on the top surface of the said concave disk, and a flat disk secured to the shaft below the said central opening and of less diameter than the said cylinder, substantially as shown and described.

3. In a grain-cleaner, the combination, with a cylinder provided with wire-screen lining and a suitable inlet, of a concave disk having a central opening and secured to the said cylinder, a shaft mounted centrally in the said cylinder and having a rotary movement, an agitator having inclined radial arms and secured to the said rotating shaft, said arms extending on the top surface of the said concave disk, and a wheel secured to the said shaft directly above the said agitator and provided with inclined blades, so as to press the grain downward onto the said agitator and concave disk, substantially as shown and described.

4. In a grain-cleaner, the combination, with a cylinder provided with a wire-screen lining and a suitable grain-inlet, of a shaft mounted centrally in the said cylinder, a fan secured on the said shaft and located in a chamber formed in the top of the said cylinder, said chamber being provided in its top plate with openings, covers adapted to open and close said openings, a cap fitting over the top of the said cylinder and forming therewith a dust-chamber, and pipes leading from the interior of the cylinder into the said dust-chamber, so as to draw the moisture out of the said cylinder by the action of the said fan-wheel, substantially as shown and described.

5. In a grain-cleaner, a cylinder having a wire-screen lining, a shaft journaled centrally in the said cylinder, a series of concave disks having central openings and secured to the interior of the said cylinder, disks secured to the said shaft between the succeeding concave disks, and an arm secured to the said shaft for discharging the grain from the cylinder into a chamber, in combination with the said chamber, a channel leading from the said chamber upward, a cap held on the upper end of the said cylinder and forming therewith a dust-chamber, into which said channel discharges, a fan-wheel secured to the said shaft and located in a chamber connected with the said dust-chamber, pipes leading from the said dust-chamber to the upper part of the said cylinder, and a chamber formed on the said cap and connected with the interior of the same by a hinged part, substantially as shown and described.

6. In a grain-cleaner, the combination, with a lined cylinder, A, and shaft F, journaled in the said cylinder, of the chute G², discharging the steamed grain into the said cylinder, the concave disks J, having the central openings, J', and fastened in the said cylinder, the flat disks N, provided with the arms N', the chamber O, formed in the said cylinder A and having the opening O² in its bottom, the arm P, secured to the said shaft F and forcing the grain into the said opening O², the valve S, adapted to open and close said opening O², the chamber Q, into which opens said valve, and provided with a chute, Q', leading to the outside of the cylinder A, the channel R, opening into the said chamber Q and extending upward, the cap B, held on the top of the said cylinder and forming a dust-chamber, the chamber D, formed in the top of the cylinder A and communicating with the said dust-chamber, the fan E, secured to the shaft F within the said chamber D, the hinged end B⁵ of the said cap B, and the pipes G', leading from the dust-chamber to the interior of the cylinder A, substantially as shown and described.

7. In a grain-cleaner, the combination, with the lined cylinder A, of the shaft F, journaled in the said cylinder, the chute G, leading into the said cylinder, the concave disks J, having central openings, J', and fastened in the said cylinder, the flat disks N, provided with the arms N', the chamber O, formed in the said cylinder A and having the opening O² in its bottom, the arm P, secured to the said shaft F and forcing the grain into the said opening O², the valve S, adapted to open and close said opening O², the chamber Q, into which opens said valve S, and provided with a chute, Q', leading to the outside of the cylinder A, the channel R, opening into the said chamber Q and extending upward, the cap B, held on the top of the said cylinder and forming a dust-chamber, the chamber D, formed in the top of the cylinder A and communicating with said dust-chamber, the fan-wheel E, secured to the shaft F and within the said chamber D, the hinged end B⁵ of the said cap B, the pipes G', leading from the dust-chamber to the interior of the cylinder A, and the chamber C, opening into the cap B and provided with the outlet-door C', substantially as shown and described.

8. In a grain-cleaner, the combination, with the lined cylinder A, of the shaft F, journaled in the said cylinder, the chute G, discharging the steamed grain into the said cylinder, the concave disks J, having central openings, J', and fastened in the said cylinder, the flat disks N, provided with the arms N', the chamber O, formed in the said cylinder A and having the opening O² in its bottom, the arm P, secured to the said shaft F and forcing the grain into the said opening O², the valve S, adapted to open and close said opening O², the chamber Q, into which opens said valve S, and provided with a chute, Q', leading to the outside of the cylinder A, the channel R, opening into the said chamber Q and extending upward, the cap B, held on the top of the said cylinder and forming a dust-chamber, the chamber D, formed in the top of the cylinder A and having openings D' in its top to communicate with said dust-chamber, the fan E, secured to the shaft F and within the said chamber D, the hinged end B⁵ of said cap B, the pipes G', leading from the dust-chamber to the interior of the cylinder A, the covers D², hinged on the top plate of the chamber D over the openings D', and the rods D³, extending through the cap B and serving to operate said covers D², substantially as shown and described.

PETER PROVOST.

Witnesses:
BYRON S. WAITE,
A. L. SAWYER.